(12) United States Patent
Russikoff

(10) Patent No.: US 10,256,589 B2
(45) Date of Patent: Apr. 9, 2019

(54) POWER ROTATING TRANSFER COUPLER

(71) Applicant: RODAN ENTERPRISES, LLC, Philadelphia, PA (US)

(72) Inventor: Ronald K. Russikoff, Philadelphia, PA (US)

(73) Assignee: RODAN ENTERPRISES, LLC, Philadelphia, PA (US)

( * ) Notice: Subject to any disclaimer, the term of this patent is extended or adjusted under 35 U.S.C. 154(b) by 0 days.

(21) Appl. No.: 15/932,795

(22) Filed: Apr. 25, 2018

(65) Prior Publication Data
US 2018/0316150 A1 Nov. 1, 2018

Related U.S. Application Data

(60) Provisional application No. 62/602,528, filed on Apr. 26, 2017.

(51) Int. Cl.
| | |
|---|---|
| *H01R 39/00* | (2006.01) |
| *H01R 39/64* | (2006.01) |
| *H01R 13/24* | (2006.01) |
| *B60P 3/34* | (2006.01) |
| *B63B 17/02* | (2006.01) |
| *E04F 10/06* | (2006.01) |

(52) U.S. Cl.
CPC ......... *H01R 39/64* (2013.01); *H01R 13/2421* (2013.01); *B60P 3/343* (2013.01); *B63B 17/02* (2013.01); *E04F 10/0603* (2013.01)

(58) Field of Classification Search
CPC .... H01R 39/64; H01R 13/24; H01R 13/2421; B60P 3/343; B63B 17/02; E04F 10/0603

USPC .......................................... 439/19–21, 29–31
See application file for complete search history.

(56) References Cited

U.S. PATENT DOCUMENTS

| | | | | |
|---|---|---|---|---|
| 3,860,312 A | * | 1/1975 | Gordon, Jr. ............ | H01R 39/64 439/31 |
| 4,022,518 A | * | 5/1977 | Gattaz .................. | H01R 24/542 439/28 |

(Continued)

*Primary Examiner* — Khiem Nguyen
(74) *Attorney, Agent, or Firm* — Armand M. Vozzo, Jr.

(57) ABSTRACT

A power rotating transfer coupler is disclosed for use within a retractable shade system of the type operatively deployed upon a rotating roller member transversely disposed within a framework and mounted in connection with a boat, recreational vehicle or other stationary structure. Adapted for mounted attachment to the end of the roller member intermediate of the roller member and the adjacent framework, the power transfer coupler comprises a contact ring assembly set immediately adjacent to the roller member having separate continuous ring members of different diameter concentrically disposed each with a separate power wire attached thereto, a contact pin assembly having separate spring-loaded contact pins each connected to a lead wire and fitted within a cylindrical housing in a respective position to make contact with a respective one of the ring members, and a compression spring centrally positioned and set against of the end of the housing for constant tensioning of the housing against the contact ring assembly so that an uninterrupted electrical connection with the respective contact rings is maintained throughout relative motion of the roller member during operational deployment of the shade system.

20 Claims, 5 Drawing Sheets

(56) References Cited

U.S. PATENT DOCUMENTS

| | | | | |
|---|---|---|---|---|
| 4,140,357 A | * | 2/1979 | Wolz | E05D 11/0081 |
| | | | | 174/86 |
| 7,571,691 B2 | * | 8/2009 | Russikoff | B63B 17/02 |
| | | | | 114/361 |
| 7,895,964 B2 | * | 3/2011 | Russikoff | B63B 17/02 |
| | | | | 114/361 |
| 8,857,366 B2 | * | 10/2014 | Russikoff | B63B 17/02 |
| | | | | 114/361 |
| 8,926,336 B2 | * | 1/2015 | Gobel | H01R 24/542 |
| | | | | 439/13 |

* cited by examiner

POWER ROTATING TRANSFER COUPLER

CROSS-REFERENCE TO RELATED APPLICATION

This application is a continuation-in-part of U.S. provisional patent application Ser. No. 62/602,528 filed Apr. 26, 2017 for Power Rotating Transfer Coupler.

BACKGROUND OF THE INVENTION

The present invention relates to electro-mechanical couplings used to allow transmission of electrical power from a moving part, such as a roller member employed in a retractable shade system, to a stationary member or fixed part to which the moving part is attached, and more particularly, to an improved power rotating transfer coupler for a retractable shade system mounted upon a building structure, boat or recreational vehicle to supply and distribute electrical power between them as needed.

On retractable canopy systems of the type that employ rotating roller members to deploy canvas or other like material as a shade cover in connection with a building, boat or recreational vehicle (RV), there can be found certain electronic elements that are useful to incorporate and operate in association with the canopy systems. Such electronic elements, including light-emitting diode (LED) devices mounted along the moving framework and flexible solar cell panels mounted upon the canvas, need means for coupling to an electrical power source and/or for distributing electrical power generated thereby, as in the case of the solar panels, in order to be effectively employed. In the case of the framework lighting, the power to energize and operate the LED devices will need to be transferred from the stationary power supply onboard the boat, the RV or upon the building to the rotating roller of the shade system. With the transfer of electrical power to the roller, the power then can be directed thru wires in the canvas shade to the framework where the installed LED devices can provide extended illumination during the night and particularly for entertaining. In the case of the solar panels affixed to the canvas material of the shade system, the energy generated from the panels while the shade is in its extended position, often all day long, will then need to be transferred down to the boat or RV structure or to the associated building as a supplemental power source to in turn power the shade and/or provide a recharge to the primary power grid. Especially onboard boats, as new and old boat models adapt more technological devices, including powered retractable shades, media systems, and assorted electrically-powered appliances, each requiring a source of energy, it has been found that the recharging demands cannot be made in reasonable period of time and can cause a lack of power when needed. This can be critical in cases that involves boats that are out fishing or entertaining on the water.

The problem of providing an uninterrupted electrical connection between coupled components throughout relative rotation thereof about a rotational axis has been addressed prior art rotatable electrical coupling devices designed and developed for particular applications. Examples of some of those prior art rotatable electrical coupling devices include Gordon, Jr. (U.S. Pat. No. 3,860,312), Gattaz (U.S. Pat. No. 4,022,518), and Gobel et al. (U.S. Pat. No. 8,926,336). While these and other prior art electrical coupling devices have performed effectively in their specific structural applications in maintaining a continuous electrical connection between mating coaxially rotating components, their coupling designs have limitations, particularly with respect to interfacing with a rotating roller member, such as those found in many retractable shade systems, and are not suitable for interfacing with the customary mounting arrangement between the roller members and the associated framework upon which shades are deployed. Therefore, a need exists for a new and improved rotating power transfer coupler for use in a roller-based retractable shade system that will provide safe and effective electrical power transfers to and from the moving shade and the stationary structure upon which the shade system operates in order to supply and distribute electrical power between them as needed.

SUMMARY OF THE INVENTION

Accordingly, it is a general purpose and object of the present invention to provide an improved electrical power transfer coupler for use in a roller-based retractable shade system of the type operatively deployed in connection with a boat, recreational vehicle or building structure.

A more particular object of the present invention is to provide an improved power transfer coupler operatively integrated to a canvas shade-deploying roller member within a retractable shade system that will provide safe and effective electrical power transfers to and from the deploying shade and the stationary structure upon which the shade system operates in order to supply and distribute electrical power as needed.

Another object of the present invention is to provide an improved electrical power transfer coupler that is safe and reliable in in its operation and easy to maintain.

Still another object of the present invention is to provide an improved electrical power transfer coupler for a retractable shade system capable of withstand the mechanical forces and movements experienced during the operational deployment of the retractable shade while maintaining electrical continuity within the system.

A still further object of the present invention is to provide an improved electrical power transfer coupler that is economical to manufacture, simple to assemble, and easy to implement.

Briefly, these and other objects of the present invention are accomplished by a power rotating transfer coupler for use within a retractable shade system of the type operatively deployed upon a rotating roller member transversely disposed within a framework and mounted in connection with a boat, recreational vehicle or other stationary structure to allow voltage transfers between the operating shade system and the stationary structure. Adapted for mounted attachment to the end of the roller member intermediate of the roller member and the adjacent framework, the power transfer coupler comprises a contact ring assembly set immediately adjacent to the roller member including a pair of separate continuous ring members each made of an electrical conductor material and formed having different diameters concentrically disposed with a separate power wire attached thereto, a contact pin assembly having separate spring-loaded contact pins each connected to a lead wire and fitted within a cylindrical housing in a respective position to make contact with a respective one of the ring members, and a compression spring centrally positioned and set against of the end of the housing for constant tensioning of the housing against the contact ring assembly so that an uninterrupted electrical connection with the respective contact rings is maintained throughout relative motion of the roller member during operational deployment of the shade system.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DESCRIPTION OF THE INVENTION

Figure 1:
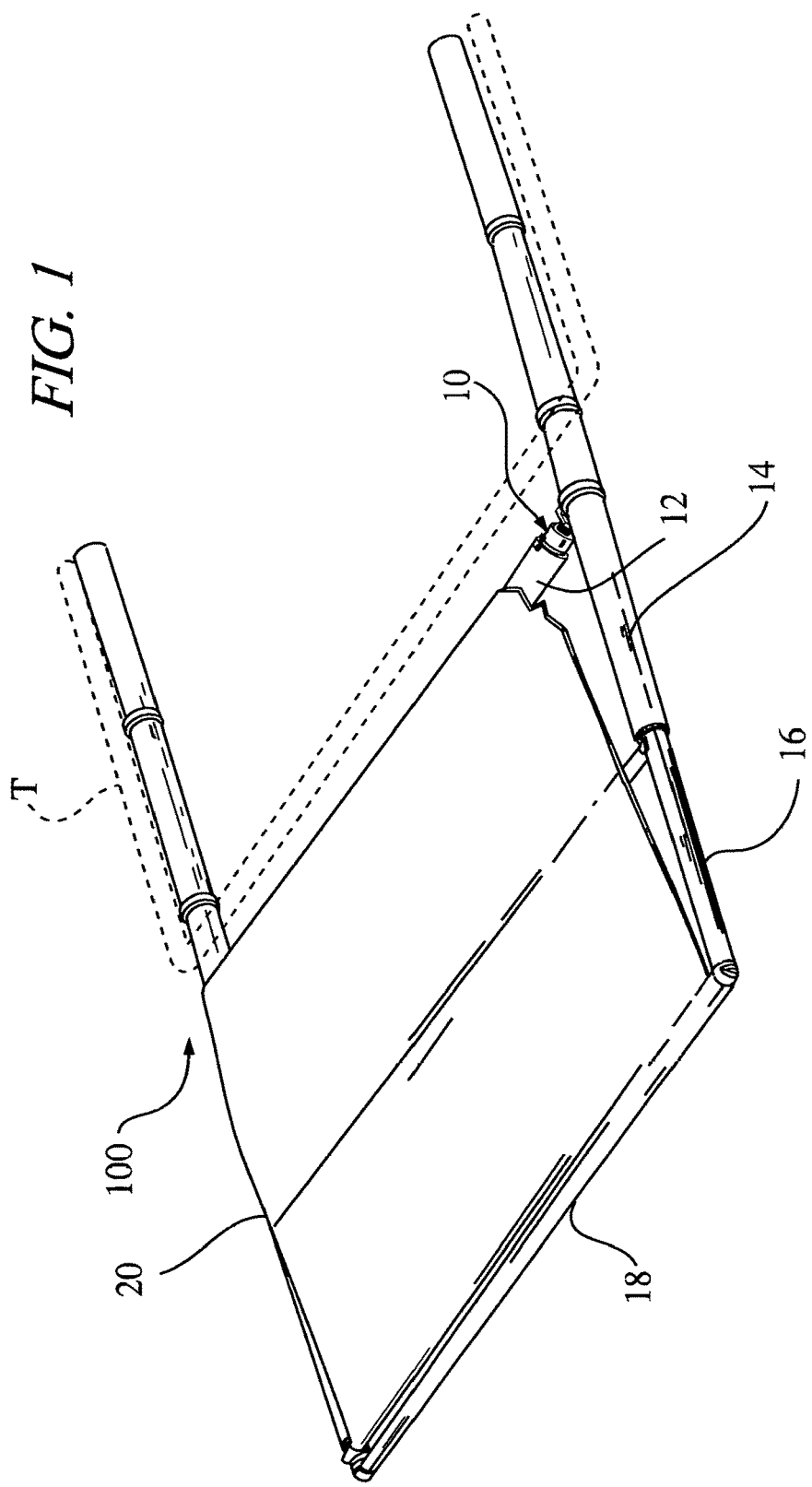
FIG. 1 is a perspective view from above of a retractable shade system having a telescopic framework deployed in an extended configuration from a rooftop structure (in phantom outline) with a portion of the extended shade cutaway to show the power transfer coupler of the present invention mounted in its preferred operating position.

The following serves to describe a preferred embodiment of the present invention and the best presently contemplated mode of its production and practice. This description is further made for the purpose of illustrating the general principles of the invention but should not be taken in a limiting sense, the scope of the invention being best determined by reference to any associated claims.

Referring to the drawings, the following is a list of structural components of the present power rotating transfer coupler, generally designated 10, and those associated structural elements shown employed in connection with the present invention:

100 retractable shade system;
T rooftop structure;
10 power transfer coupler;
12 roller tube member;
14 first stage tubular actuator member;
16 second stage tubular actuator member;
18 forward crossbar;
20 canvas shade,
22 contact ring assembly;
23 mounting ring
24 contact pin housing;
24a guide slots;
25 contact pin assembly;
26 guide pin;
27a first power wire;
27b second power wire;
28a first lead wire;
28b second lead wire;
29a first contact screw;
29b second contact screw;
30a first spring-loaded contact pin assembly;
30b second spring-loaded contact pin assembly;
32 core compression spring;
34 core spring cap;
36 mounting pad
36a first contact pin compression spring;
36b second contact pin compression spring;
37a first contact pin;
37b second contact pin;
38 mounting fitting;
39 mounting screws;
40 larger diameter contact ring;
42 smaller diameter contact ring.

Figure 2:
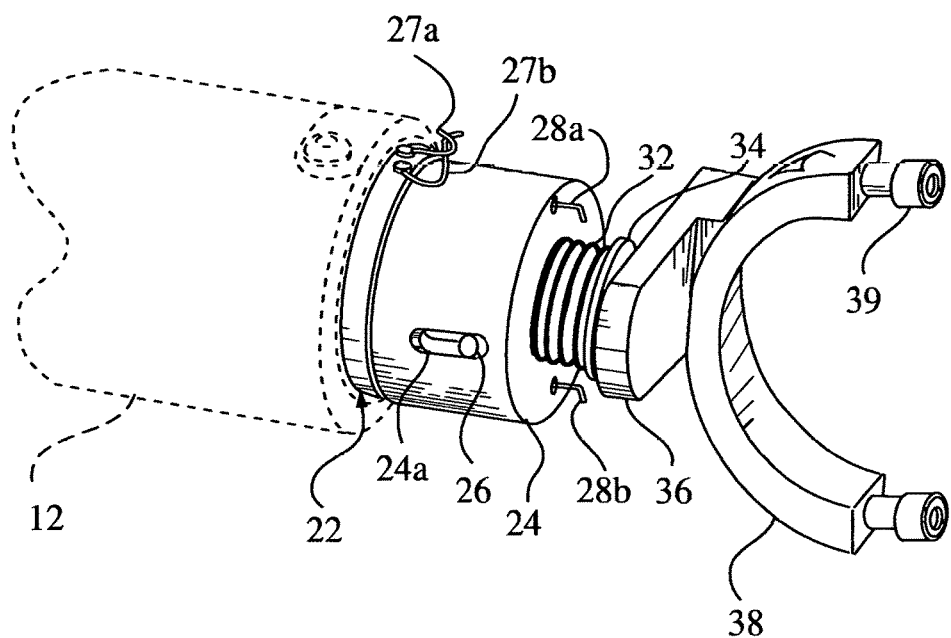
FIG. 2 is an enlarged perspective view of the power transfer coupler in accordance with the present invention mounted in its assembled state relative to the roller member (in phantom) of the retractable shade system shown in FIG. 1.

Referring now to the drawings and initially to FIGS. 1 and 2, the power rotating transfer coupler 10 of the present invention is assembled and adapted for a stationary mounting relative to a rotatable roller tube member 12 within a retractable shade system 100 of the type having a parallel framework of multiple telescopically extending tubular actuator members 14 and 16 set on either side of the roller tube member that is used to carry thereon a length of canvas shade material 20 capable of being extended upon a forward crossbar 18 and retracted back upon the roller tube member under controlled movement, powered or manually implemented, of the actuator tubes. This type of retractable shade system can be found implemented and used in connection with a boat (not shown) and made to operate in connection with a rooftop structure T on the boat or may be as well used in connection with a recreational vehicle or building structure (neither shown). Examples of this type of retractable shade system 100 are found described in U.S. Pat. Nos. 8,857,366, 7,895,964 and 7,571,691.

In accordance with the present invention, the power rotating transfer coupler 10 is mounted in a stationary position alongside the roller tube member 12 substantially in line with its longitudinal axis between an end of the roller tube member and the proximate tubular actuator member 14 of the parallel framework of the retractable shade system 100. One end of the power rotating coupler 10 is attached directly to the end of the roller member 12 while the opposite end of the coupler is held secured to the proximate tubular member 14 with a mounting fitting 38 formed having a radius to fit about the tubular member with mounting screws 39 to hold the coupler firmly in place substantially in line with the longitudinal axis of the roller member. As best seen in FIG. 2, a mounting pad 36 formed upon and projecting from the outer circumference of the mounting fitting 38 in a tangential direction serves to maintain the power transfer coupler 10 in its properly mounted position relative to the roller member 12.

Figure 3:
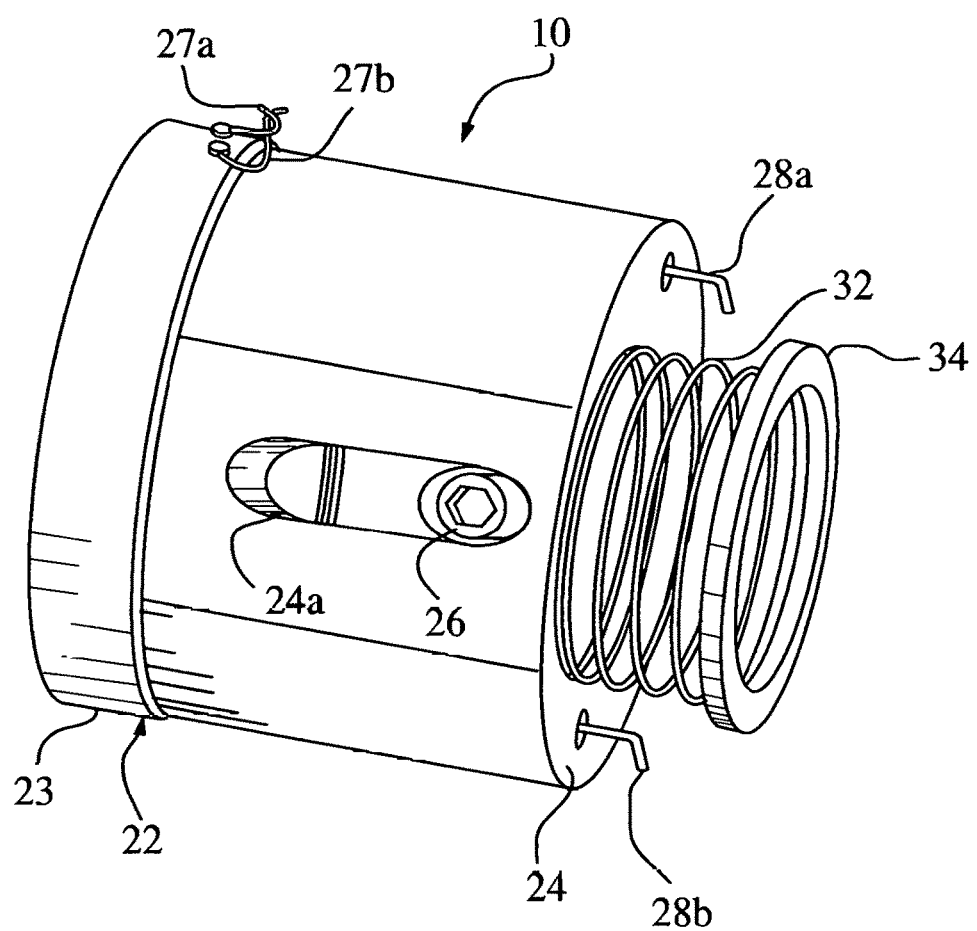
FIG. 3 is a further perspective view of the power transfer coupler of FIG. 2 shown separate and apart from its mounted position according to the present invention.

Referring now to FIG. 3 in conjunction with FIG. 2, the present power transfer coupler 10 comprises a contact ring assembly 22 disposed and mounted immediately adjacent to the roller tube member 12 with a mounting ring member 23 surrounding a pair of separate concentric ring members 40 and 42, shown more clearly in FIGS. 4 and 6 and described below in greater detail. Each of the separate ring members 40 and 42 are made similarly from an electrical conductor material and are adapted to hold and connect to separate power wires 27a and 27b carrying electrical power through respective screw attachments 29a and 29b. The present power transfer coupler 10 further comprises a spring-loaded contact pin assembly 25 disposed immediately adjacent to the contact ring assembly 22 and connected thereto opposite from the roller tube member 12. The contact pin assembly 25 includes a cylindrically shaped housing 24 formed and fitted to contain a pair of separate spring-loaded contact pins 30a and 30b, shown and described in greater detail below with respect to FIGS. 4 and 5, with each of the contact pins being respectively connected to separate lead wires 28a and 28b that are accommodated for routing from the end of the housing 24 opposite from the contact ring assembly 22 to allow further electrical connections to be established. The contact pin housing 24 is further formed having a central core longitudinally there through and a guide slot 24a made transversely through the surface wall of the housing on opposite sides thereof The guide slot 24a is formed similarly on both sides of the contact pin housing 24 to extend a certain length in the longitudinal direction to allow and accommodate certain side-to-side or longitudinal movements made by the roller member 12 during operation. A fixed guide pin 26 fitted to engage the lots 24a on both sides and having a length sufficient to extend transversely there through will allow the contact pin housing 24 to move a limited distance longitudinally, as may be needed, upon the guide pin and within the guide slots. This arrangement of the guide slots 24a formed and fitted with the fixed guide pin 26 also serves to keep the stationary portion of the power transfer coupler 10, namely the contact pin assembly 25 and its housing 24, from spinning with the rotation of the roller member 12. It should be noted and understood that other structural alternatives to the described guide slot 24a and guide pin 26 arrangement may be implemented within the scope of the present invention particularly to keep the contact pin housing 24 from spinning along with the roller member 12.

A coil compression spring 32 centrally positioned in line with the housing core is fixed against the outer end of the housing 24 to further accommodate longitudinal (non-rotational) roller movement and more importantly, to provide constant urging of the contact pin assembly 25 against the contact ring assembly 22 and the contact rings 40 and 42 contained therein to maintain an uninterrupted electrical connection with the respective contact rings throughout relative motion of the roller member that may occur during operational deployment of the retractable shade system 100. A cap member 34 fitted for enclosing the outer end of the compression spring 32 is provided to maintain the spring and its function and facilitate the spring-loaded placement of the contact pin assembly 25 of the present power transfer coupler 10 within the shade system 100.

Figure 4:
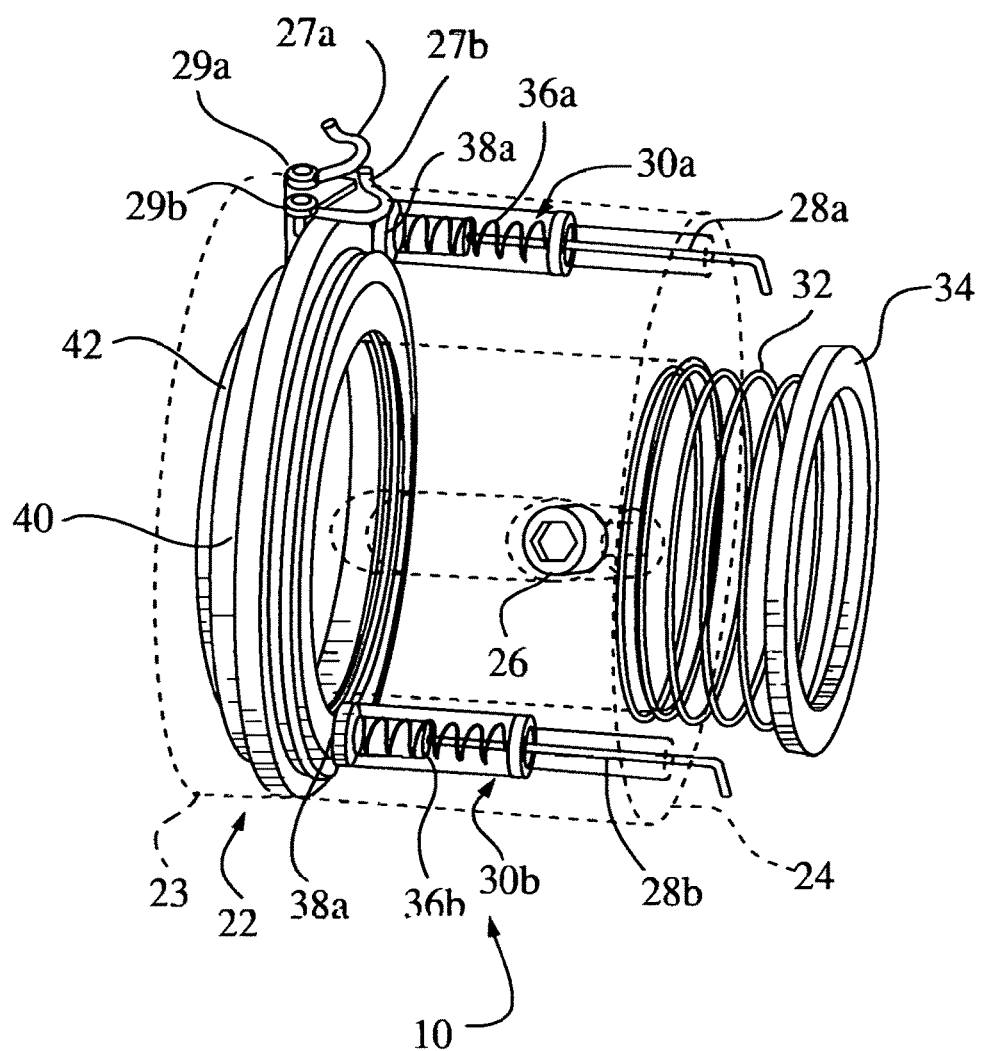
FIG. 4 is a further perspective view of the power transfer coupler of FIG. 3 with the exterior housings in dotted outline to show the interior arrangement of component elements thereof.
Figure 5:
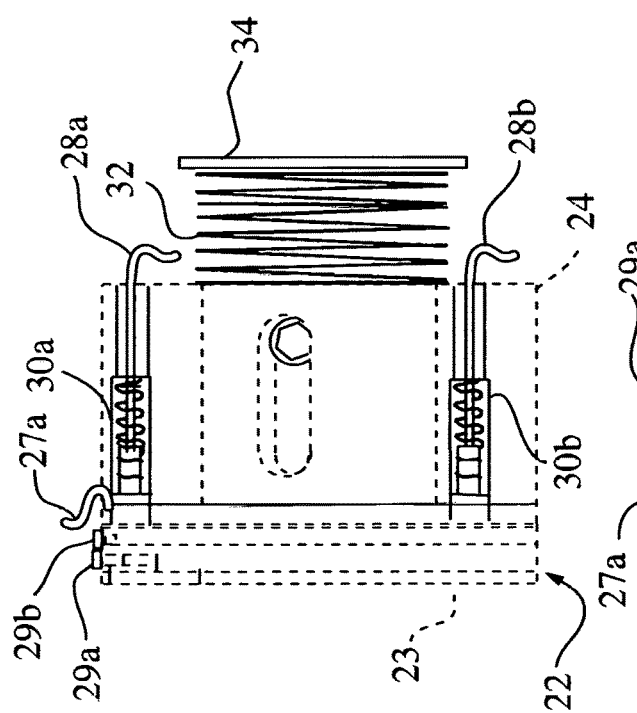
FIG. 5 is a side elevation view of the power transfer coupler as shown in FIG. 4.

Referring now to FIGS. 4 and 5 in conjunction with FIG. 3, the interior of the contact pin housing 24 is formed to carry and contain a separate pair of spring-loaded contact pin assemblies 30a and 30b that are disposed longitudinally in parallel channels formed within the housing and directed at the respective outer (larger diameter) and inner (smaller diameter) contact ring members 40 and 42 contained within the contact ring assembly 22 at the joint interface with the contact pin housing. Each of the respective contact pin assemblies 30a and 30b includes a pad-like contact pin 37a and 37b fitted to engage a compression spring 36a and 36b within a cylindrical channel formed within the housing 24 so that compression forces are applied to the respective contact pins that maintain each one in intimate contact with a corresponding one of the contact rings 40 and 42. To provide for separate positive and negative voltage leads, one of the contact pins 37a is directed to make contact with the larger diameter (outer) contact ring 40 and the other contact pin 37b is directed to make contact with the smaller diameter (inner) contact ring. Lead wires 28a and 28b attached to the interior ends of the respective contact pins 37a and 37b are routed from the respective channels in the housing 24 to further transmit the electrical power from the coupler 10 and distribute it as and where needed.

Figure 6:
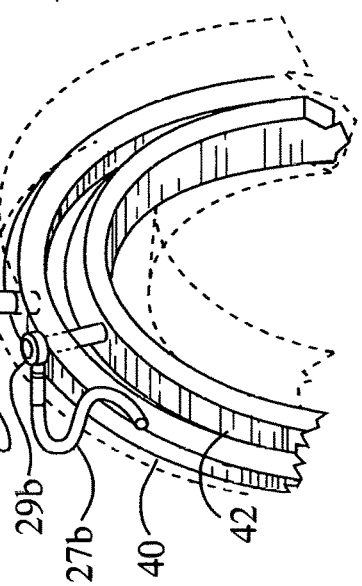
FIG. 6 is a partial perspective view of the separate contact rings of the present power transfer coupler taken from the end proximate to the roller member showing their respective positioning and lead wire attachments.

Referring to FIG. 6 in conjunction with FIGS. 4 and 5, the respective contact rings 40 and 42 are sufficiently different in their diameters and separated in their concentric arrangement to establish distinct electrical contacts and conductor paths for safe delivery of voltage power. The respective contact rings 40 and 42 are also formed and sized differently in their respective longitudinal thicknesses to provide sufficient space to accommodate the mounted positioning of the respective screw attachments 29a and 29b of lead power wires 27a and 27b to the respective rings. As best seen in FIGS. 5 and 6, the smaller diameter contact ring 42 is longer in its longitudinal thickness to provide separation and unobstructed direct attachment of its lead power wire 27b via screw attachment 29b without interference with the larger outer contact ring 40, which is instead narrower in its longitudinal thickness and unobstructed for direct connection of its power wire 27a to the surface of the outer contact ring via screw attachment 29a.

Therefore, it is apparent that the described invention provides an improved electrical power transfer coupler for use in a roller-based retractable shade system of the type operated in connection with a boat, recreational vehicle or building structure. More particularly, the described invention provides an improved power transfer coupler that may be operatively integrated to a shade-deploying roller member within a retractable shade system, providing safe and effective electrical power transfers to and from the working shade and the stationary structure upon which the shade system operates in order to supply and distribute electrical power as needed. The described power transfer coupler is capable of withstanding the mechanical forces and movements experienced during the operational deployment of the retractable shade while maintaining electrical continuity within the system and can provide uninterrupted electrical connection between the moving and fixed portions of the shade system and the structure from which it is deployed. The foregoing power transfer coupler is also safe and reliable in in its operation and is easy to maintain. Furthermore, the described electrical power transfer coupler provides a unit that is economical to manufacture, simple to assemble, and easy to implement.

Obviously, other embodiments and modifications of the present invention will readily come to those of ordinary skill in the art having the benefit of the teachings presented in the foregoing description and drawings. For example, with respect to the above-described formation of guide slots 24a in the contact pin housing 24 with fitted engagement there through of a fixed guide pin 26 to keep the contact pin housing from spinning with the rotation of the roller member 12, an alternate design would be to have two or more fixed pins projecting from the end of the contact pin housing 24 nearest to the stationary framework so that the pins may engage a fixed post configuration on the framework to prevent any rotational movement of the contact pin housing and the contact pin assemblies 30a and 30b contained therein. Alternate embodiments of different shapes and sizes, as well as substitution of known materials or those materials which may be developed at a future time to perform the same function as the present described embodiment are further considered to be part of the present invention. Furthermore, certain modifications to the described embodiment that serve to benefit its usage are within the scope of the present invention. Accordingly, it is understood that this invention is not limited to the particular embodiment described, but rather is intended to cover modifications within the spirit and scope of the present invention as expressed in the appended claims.

What is claimed is:

1. An electrical power transfer coupling device for fitted attachment to an end of a roller member rotating about its longitudinal axis in operational deployment of a retractable shade, comprising:
   a contact ring assembly housed and mounted to the end of the roller member for rotation therewith along the longitudinal axis thereof, said contact ring assembly including a separate pair of continuous ring members having different relative diameters and concentrically disposed within said assembly, each of the ring members formed having an electrical conductor surface to provide separate electrical conductor paths; and
   a contact pin assembly housed and adapted to mount in engagement with said contact ring assembly, said contact pin assembly including a pair of spring-loaded contact pins longitudinally disposed in separate positions to engage in contact with a respective conductor surface of one of the separate pair of ring members.

2. An electrical power transfer coupling device according to claim 1, further comprising:
   mounting means operatively connected to said contact pin assembly for maintaining the proper position thereof in engagement with said contact ring assembly substantially along the longitudinal axis of the roller member.

3. An electrical power transfer coupling device according to claim 2, wherein said contact ring assembly further comprises:
   a ring housing cylindrical in form surrounding the separate pair of contact rings and made to maintain the contact rings in their concentric disposition; and
   a pair of electrical conductors connected to respective surfaces of the pair of contact ring members and routed from said ring housing.

4. An electrical power transfer coupling device according to claim 2, wherein said contact pin assembly further comprises:
   a contact pin housing having a cylindrical surface wall surrounding a central core chamber formed therethrough, the surface wall being further formed with a pair of longitudinal channels to contain the respective pair of spring-loaded contact pins in their longitudinal dispositions to engage the respective surfaces of the pair of ring members.

5. An electrical power transfer coupling device according to claim 4, wherein each of said spring-loaded contact pins further comprises:
   a contact pin member having a pad-like head at one end of the length thereof;
   a compression spring sized and shaped to fit within the respective longitudinal channels of the contact pin housing and along the length of the contact pin member to engage the pad-like head thereof so that a compression force may be applied longitudinally to the head of the contact pin when contained within the channel of said housing; and
   a lead wire attached to the opposite end of the contact pin member and routed therefrom and through the respective channels of said housing.

6. An electrical power transfer coupling device according to claim 4, wherein:
   said contact pin housing is further formed having a slot of a certain length made transversely through the cylindrical surface wall of the housing on opposite sides thereof; and
   a guide pin is inserted through the slots on opposite sides of the contact pin housing and maintained transversely extending through the slots to keep the contact pin assembly from rotating and accommodate certain longitudinal movements of the roller member during operation.

7. An electrical power transfer coupling device according to claim 6, wherein said mounting means comprises:
   a coil compression spring positioned to engage the outer end of the contact pin housing and mounted in place substantially along the longitudinal axis of the roller member to urge said housing against the contact ring assembly so that the contact pins remain engaged in contact with the respective surfaces of the contact rings during operational deployment of the shade system.

8. A power transfer coupler for mounted attachment to an end of a roller member capable of rotating about its longitudinal axis in operational deployment of a retractable shade from a stationary structure, comprising:
   a contact ring assembly housed and mounted to the end of the roller member for rotation therewith along the longitudinal axis thereof, said contact ring assembly including a separate pair of continuous ring members having different relative diameters and concentrically disposed within said assembly, each of the ring members formed having an electrical conductor surface to provide separate electrical conductor paths;
   a contact pin assembly housed and adapted to mount in engagement with said contact ring assembly, said contact pin assembly including a pair of spring-loaded contact pins longitudinally disposed in separate positions to engage in contact with a respective conductor surface of one of the separate pair of ring members; and
   mounting means operatively connected to said contact pin assembly for maintaining the proper position thereof in engagement with said contact ring assembly substantially along the longitudinal axis of the roller member.

9. A power transfer coupler according to claim 8, wherein said mounting means comprises:
   a coil compression spring positioned to engage the outer end of the contact pin housing and mounted in place substantially along the longitudinal axis of the roller member to urge said housing against the contact ring assembly so that the contact pins remain engaged in contact with the respective surfaces of the contact rings during operational deployment of the shade system.

10. A power transfer coupler according to claim 8, wherein said contact ring assembly further comprises:
    a ring housing cylindrical in form surrounding the separate pair of contact rings and made to maintain the contact rings in their concentric disposition; and
    a pair of electrical conductors connected to respective surfaces of the pair of contact ring members and routed from said ring housing.

11. A power transfer coupler according to claim 10, wherein said contact pin assembly further comprises:
    a contact pin housing having a cylindrical surface wall surrounding a central core chamber formed therethrough, the surface wall being further formed with a pair of longitudinal channels to contain the respective pair of spring-loaded contact pins in their longitudinal dispositions to engage the respective surfaces of the pair of ring members.

12. A power transfer coupler according to claim 11, wherein each of said spring-loaded contact pins further comprises:
- a contact pin member having a pad-like head at one end of the length thereof;
- a compression spring sized and shaped to fit within the respective longitudinal channels of the contact pin housing and along the length of the contact pin member to engage the pad-like head thereof so that a compression force may be applied longitudinally to the head of the contact pin when contained within the channel of said housing; and
- a lead wire attached to the opposite end of the contact pin member and routed therefrom and through the respective channels of said housing.

13. A power transfer coupler according to claim 12, wherein said mounting means further comprises:
- interface means for preventing the rotation of said contact pin housing during the rotational movement of the roller member, said interface means including a plurality of pin members spaced apart on the b surface of said contact pin housing and configured to engage with the proximate surface of the stationary structure to keep the contact pin assembly from spinning during operation.

14. In a retractable shade system of the type having a longitudinal roller member capable of rotating about its longitudinal axis in operational deployment of the retractable shade from a stationary structure, the improvement of a power transfer coupler comprising:
- a contact ring assembly housed and mounted to the end of the roller member for rotation therewith along the longitudinal axis thereof, said contact ring assembly including a separate pair of continuous ring members having different relative diameters and concentrically disposed within said assembly, each of the ring members formed having an electrical conductor surface to provide separate electrical conductor paths; and
- a contact pin assembly housed and adapted to mount in engagement with said contact ring assembly, said contact pin assembly including a pair of spring-loaded contact pins disposed in separate positions to engage in contact with a respective conductor surface of one of the separate pair of ring members.

15. The power transfer coupler improvement according to claim 14, wherein said contact ring assembly further comprises:
- a ring housing cylindrical in form surrounding the separate pair of contact rings and made to maintain the contact rings in their concentric disposition; and
- a pair of electrical conductors connected to respective surfaces of the pair of contact ring members and routed from said ring housing.

16. The power transfer coupler improvement according to claim 14, wherein said contact pin assembly further comprises:
- a contact pin housing having a cylindrical surface wall surrounding a central core chamber formed therethrough, the surface wall being further formed with a pair of channels therein to contain the respective pair of spring-loaded contact pins in their separate dispositions to engage the respective surfaces of the pair of ring members.

17. The power transfer coupler improvement according to claim 16, wherein each of said spring-loaded contact pins further comprises:
- a contact pin member having a pad-like head at one end of the length thereof;
- a compression spring sized and shaped to fit within the respective channels of the contact pin housing and along the length of the contact pin member to engage the pad-like head thereof so that a compression force may be applied to the head of the contact pin when contained within the channel of said housing; and
- a lead wire attached to the opposite end of the contact pin member and routed therefrom and through the respective channels of said housing.

18. The power transfer coupler improvement according to claim 17, further comprising:
- mounting means connected to said contact pin assembly for maintaining the proper position thereof in engagement with said contact ring assembly.

19. The power transfer coupler improvement according to claim 18, wherein said mounting means comprises:
- a coil compression spring positioned to engage the contact pin housing and mounted in place to urge said housing upon the contact ring assembly so that the contact pins remain engaged in contact with the respective surfaces of the contact rings during operational deployment of the shade system.

20. The power transfer coupler improvement according to claim 18, wherein said mounting means further comprises:
- interface means for preventing the rotation of said contact pin housing during the rotational movement of the roller member, said interface means including a plurality of pin members spaced apart on the surface of said contact pin housing and configured to engage with the proximate surface of the stationary structure to keep the contact pin assembly from spinning during operation.

* * * * *